United States Patent
Wagner

(10) Patent No.: US 8,197,209 B2
(45) Date of Patent: Jun. 12, 2012

(54) SYSTEMS AND METHODS INVOLVING VARIABLE THROAT AREA VANES

(75) Inventor: Joel H. Wagner, Wethersfield, CT (US)

(73) Assignee: United Technologies Corp., Hartford, CT (US)

( * ) Notice: Subject to any disclaimer, the term of this patent is extended or adjusted under 35 U.S.C. 154(b) by 1148 days.

(21) Appl. No.: 11/959,759

(22) Filed: Dec. 19, 2007

(65) Prior Publication Data

US 2009/0162189 A1 Jun. 25, 2009

(51) Int. Cl.
*F01D 9/02* (2006.01)
(52) U.S. Cl. .............. 416/90 R; 416/231 R; 415/914
(58) Field of Classification Search ........... 415/115, 415/116, 117, 191, 914; 416/90 R, 231 R, 416/231 B
See application file for complete search history.

(56) References Cited

U.S. PATENT DOCUMENTS

| | | | |
|---|---|---|---|
| 2,825,532 A * | 3/1958 | Kadosch et al. | 415/115 |
| 4,072,008 A | 2/1978 | Kenworthy et al. | |
| 4,504,189 A | 3/1985 | Lings | |
| 4,624,104 A * | 11/1986 | Stroem | 60/806 |
| 4,707,981 A | 11/1987 | Wagner | |
| 4,740,138 A | 4/1988 | Zaehring et al. | |
| 4,741,667 A | 5/1988 | Price et al. | |
| 5,207,556 A | 5/1993 | Frederick et al. | |
| 5,382,135 A * | 1/1995 | Green | 416/97 R |
| 5,645,397 A | 7/1997 | Soechting et al. | |
| 6,164,903 A | 12/2000 | Kouris | |
| 6,334,753 B1 | 1/2002 | Tillman et al. | |
| 6,565,313 B2 | 5/2003 | Nikkanen et al. | |
| 7,004,047 B2 | 2/2006 | Rey et al. | |
| 2009/0016871 A1 * | 1/2009 | McCaffrey | 415/115 |

FOREIGN PATENT DOCUMENTS

| | | |
|---|---|---|
| EP | 164539 | 12/1985 |
| EP | 1659293 | 5/2006 |
| FR | 1499216 | 10/1967 |
| FR | 2487913 | 2/1982 |

OTHER PUBLICATIONS

EP Search Report dated Apr. 6, 2011.

* cited by examiner

*Primary Examiner* — Edward Look
*Assistant Examiner* — Ryan Ellis
(74) *Attorney, Agent, or Firm* — Carlson, Gaskey & Olds, P.C.

(57) ABSTRACT

Systems and methods involving variable throat area vanes are provided. In this regard, a representative gas turbine engine includes: a vane extending into a gas flow path and having: an interior operative to receive pressurized air; a pressure surface portion; and a first port communicating between the interior and pressure surface portion, the first port being operative to receive the pressurized air from the interior and emit the pressurized air, wherein the emitted pressurized air displaces the gas flow path such that a throat area defined, at least in part, by the vane is modified.

15 Claims, 2 Drawing Sheets

SYSTEMS AND METHODS INVOLVING VARIABLE THROAT AREA VANES

BACKGROUND

1. Technical Field

The disclosure relates to gas turbine engines.

2. Description of the Related Art

Gas turbine engines use compressors to compress gas for combustion. In particular, a compressor typically uses stages, each of which incorporates a row of rotating blades and a row of stationary vanes to compress gas. Gas flowing through such a compressor is forced between the rows and between adjacent blades and vanes of a given row. Similarly, after combustion, hot expanding gas drives a turbine that uses stages, each of which incorporates a row of stationary vanes and a row of rotating blades.

The flow rate through the turbine is set by adjusting the throat areas of the vanes and/or blades. Modifying the throat areas has the effect of changing the relationship between flow rate and pressure ratio of the engine. Changing the pressure ratio tends to have an effect on the operating temperatures of the engine and, therefore, affects engine performance. Therefore, manipulation of the throat areas may be desirable to adjust the aerodynamic characteristics of the gas turbine engine under certain operating conditions.

SUMMARY

Systems and methods involving variable throat area vanes are provided. In this regard, an exemplary embodiment of a gas turbine engine comprises: a vane extending into a gas flow path and having: an interior operative to receive pressurized air; a pressure surface portion; and a first port communicating between the interior and pressure surface portion, the first port being operative to receive the pressurized air from the interior and emit the pressurized air, wherein the emitted pressurized air displaces the gas flow path such that a throat area defined, at least in part, by the vane is modified.

An exemplary embodiment of a vane assembly comprises: a vane having: a pressure surface portion; a suction surface portion; an interior defining a cavity operative to receive pressurized air; and a port communicating between the interior and the pressure surface portion, the port being operative to receive pressurized air from the interior and emit the pressurized air through the pressure surface portion; and an adjacent vane such that relative placement of the vane and the adjacent vane define a throat area; wherein the pressurized air emitted from the port of the vane displaces the gas flow path such that the throat area is modified.

An exemplary embodiment of a method for displacing the gas flow path between turbine vanes comprises: directing a gas flow path of a gas turbine engine between a vane and an adjacent vane of a turbine stage, each of the vane and the adjacent vane having an outer surface and an interior; and receiving pressurized air from a port communicating between the outer surface and the interior of the vane such that the emitted pressurized air from the vane displaces the gas flow path and modifies a throat area between the vane and the adjacent vane.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Systems and methods involving vanes of gas turbine engines are provided. In this regard, several exemplary embodiments will be described. Notably, gas passing through a gas turbine engine enters a turbine that includes rotating blades and stationary vanes. The gas, following the gas flow path, is forced between adjacent vanes. The vanes are shaped like airfoils and, therefore, have aerodynamic properties similar to airfoils. The flow of gas between adjacent vanes results in a minimum throat area determined by, for example, the shape and relative proximity of the vanes, and the velocity and volume of gases passing between the vanes. Often, the shape of the vanes and/or the angle of the vanes relative to the gas flow path may be mechanically changed to vary the location and/or size of the throat area and alter the operating characteristics of the engine. However, it may be desirable, either additionally or alternatively, to alter the location and/or size of the throat area aerodynamically. For the purposes of this disclosure, throat area is defined as the minimum flow area, corresponding to the limiting streamlines, established by the shape and placement of the vanes and associated platform surfaces.

Figure 1:
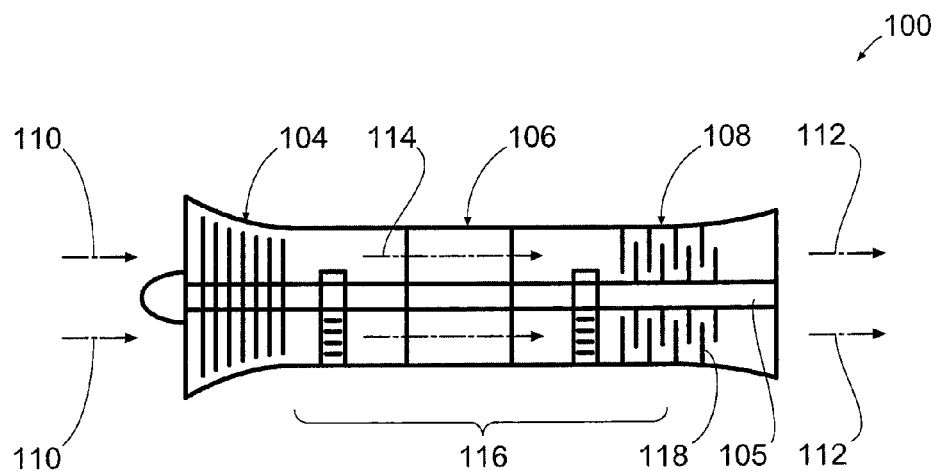
FIG. 1 is a side cut-away view of an exemplary embodiment of a gas turbine engine.

Referring now in detail to the drawings, FIG. 1 is a schematic side view illustrating an exemplary embodiment of a gas turbine engine 100 that incorporates variable turbine vanes 118. As shown in FIG. 1, engine 100 includes a compression section 104 that is linked to a power turbine section 108 by a shaft 105. Bleed air path 116 routes pressurized air to variable vanes 118.

In operation, gas 110 enters the compression section 104 and is compressed. The compressed gas then travels along gas flow path 114 and is mixed with fuel and combusted in the combustion section 106. The gas then enters the turbine section 108 and exits the engine as exhaust gas 112.

Pressurized air, such as bleed air, may be bled from the gas flow path and routed around the combustion section 106 to provide pressurized air to the variable vanes 118 via bleed air path 116. The pressurized air is used to displace the gas aerodynamically along the gas flow path, thereby changing the throat area between adjacent vanes.

Figure 2:
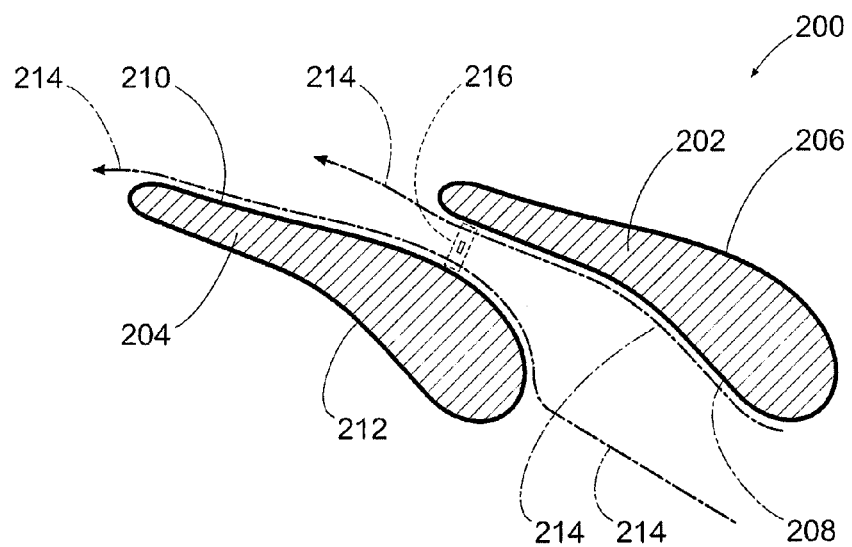
FIG. 2 is a top cut-away view of an exemplary embodiment of a vane assembly.

FIG. 2 is a top view cutaway of an exemplary embodiment of adjacent vanes 200 in a row that includes a vane 202 and a vane 204. Vanes 202 and 204 are attached to a stationary portion of the engine such as a case structure (not shown). Vane 202 has a suction surface portion 206 and a pressure surface portion 208. Vane 204 has a suction surface portion 210 and a pressure surface portion 212. In operation, gasses flow along gas flow path 214 between the vane 202 and the vane 204 and in very close proximity to the suction 210 and pressure 208 surfaces. The vane 202 and the vane 204 define a throat area 216, which is the minimal area between the vanes 202, 204. The shape of the vane 202 and the vane 204, their proximity to each other, and the stagger angle of the vane to the gas flow path 214 are possible factors that can influence the location and size of the throat area 216. Although the gas flow path 214 is shown flowing from right to left in the figures, it is understood that vanes 202 and 204 could be mirrored with the gas flow path 214 flowing from left to right.

Figure 3:
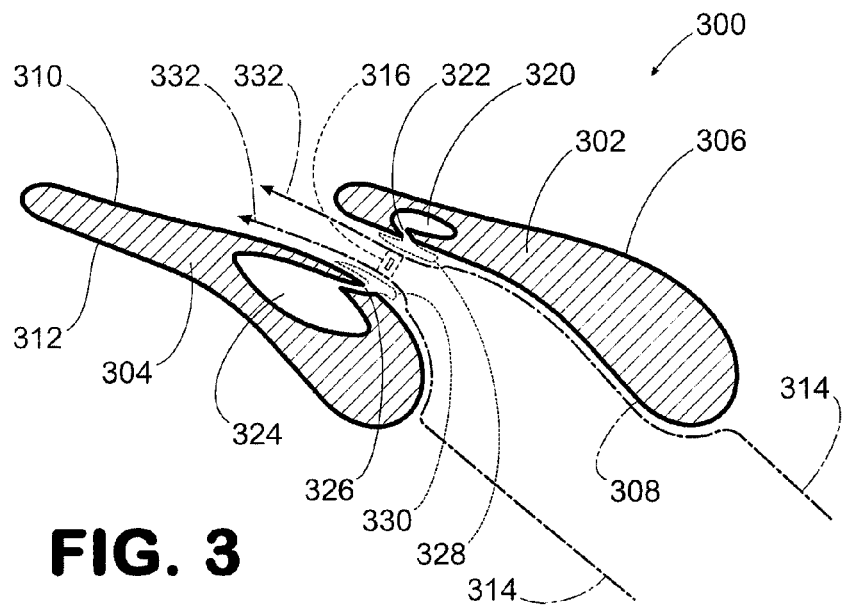
FIG. 3 is a top cut-away view of an alternative exemplary embodiment of a vane assembly.

FIG. 3 is a top cutaway view of an exemplary embodiment of vanes 300. A vane 302 has a suction surface portion 306 and a pressure surface portion 308. The vane 302 has an interior cavity 320 and a port 322, which communicates between the interior cavity 320 and the pressure surface portion 308. A vane 304 has a suction surface portion 310 and a pressure surface portion 312. The vane 304 has an interior cavity 324 and a port 326, which communicates between the interior cavity 324 and the suction portion 310. The ports 322 and 326 may be located near the minimal throat area 316.

In operation, the vane 302 and the vane 304 have inner cavities 320 and 324 that receive pressurized air, and emit the pressurized air through ports 322 and 326 in a direction substantially counter to the gas flow path 314. The emitted pressurized air forms regions of recirculating air 328 and 330 that displace the gasses in the gas flow path 314 away from the pressure surface portion 308 of vane 302 and away from the suction surface portion 310 of the vane 304 near the throat area 316. This displacement causes the throat area to be made effectively smaller resulting in a modified gas flow path 332.

Additionally, it may be desirable to emit the pressurized air in a direction substantially perpendicular to the gas flow path 314 or in a direction down stream of the gas flow path 314. Another alternative embodiment of the vanes 300 may include vanes 302 and 304 that have ports on both the pressure surface portions and suction surface portions of the vanes.

The shape of the vanes 302 and 304 illustrated in FIG. 3 is merely an illustration of but one possible embodiment. The shape of the vanes 302 and 304 may vary depending on a variety of factors including, but not limited to, the component to which the vanes 302 and 304 are attached, the location of the vanes 302 and 304 in the gas turbine engine, the gas flow path around the vanes 302 and 304 at particular gas flow velocities, desired design characteristics of the gas turbine engine, and materials used in the fabrication of the gas turbine engine.

Figure 4:
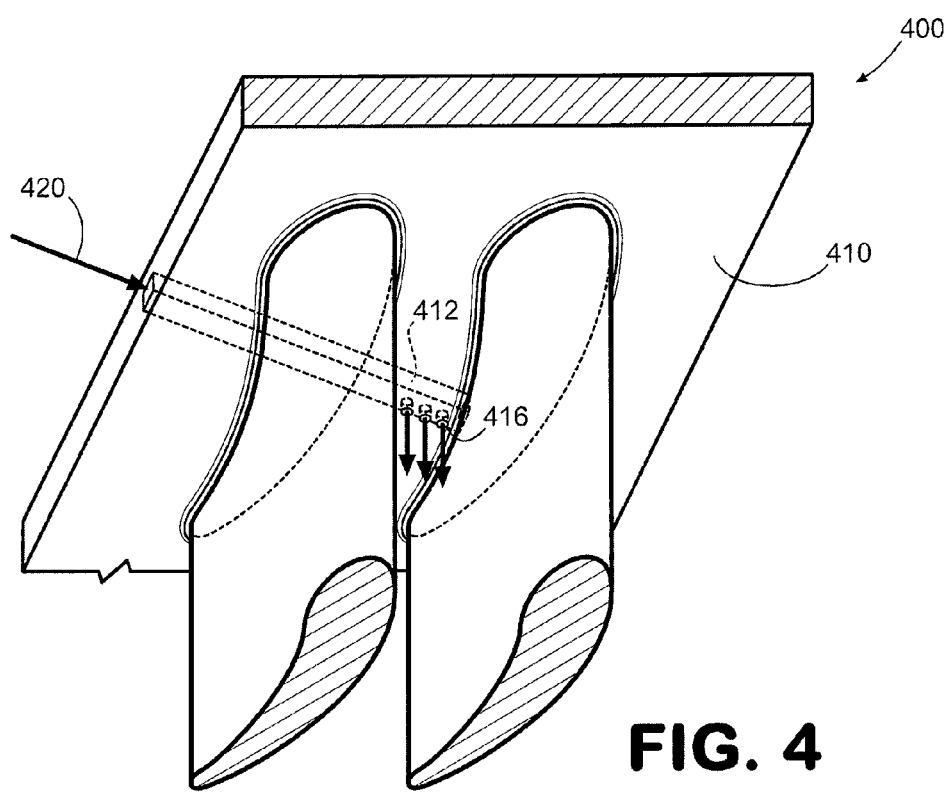
FIG. 4 is a partially cut-away, isometric view of an alternative exemplary embodiment of a vane and platform assembly.

FIG. 4 illustrates a partially cut-away, isometric view of an assembly 400 of vanes that includes a platform. In this alternative embodiment, a vane 402 and a vane 404 are depicted attached to a platform 410. Notably, platform 410 is an outer diameter platform that is attached to the radially outermost ends of the vanes. Platform 410 includes a cavity 412 and a plurality of ports (e.g., port 416) located in a vicinity of the throat that communicate with the cavity and the inner flow path of the outer diameter platform. An inner diameter platform that is attached to the radially innermost terminating ends of the vanes is not depicted.

In operation, the cavity 412 may receive pressurized air 420 and emit the pressurized air from the plurality of platform ports. The emitted pressurized air provided through the ports displaces the gas flow path by forming a recirculation region (not shown), thereby modifying the throat area (not shown) defined by vanes 402 and 404. Specifically, the throat area is modified in the radial dimension defined by the lengths of adjacent vanes between the inner and outer platforms. This is in contrast to modification of a throat area, such as depicted in FIG. 3, which occurs with respect to the width of an annular segment extending between adjacent vanes.

Additionally or alternatively, some embodiments can include inner diameter platforms that are configured to modify throat areas.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A gas turbine engine defining a gas flow path, the gas turbine engine comprising:
    a vane extending into the gas flow path and having:
    an interior operative to receive pressurized air;
    a pressure surface portion; and
    a first port communicating between the interior and pressure surface portion, the first port being operative to receive the pressurized air from the interior and emit the pressurized air, wherein the emitted pressurized air displaces the gas flow path such that a throat area defined, at least in part, by the vane is modified wherein the vane is configured such that the pressurized air is emitted in a direction that is substantially upstream relative to the gas flow path.

2. The turbine engine of claim 1, further comprising an adjacent vane having a pressure surface portion and a suction surface portion, the throat area being defined by the vane and the adjacent vane.

3. The turbine engine of claim 2, wherein the adjacent vane further comprises a second port operative to emit pressurized air from the suction surface portion such that the pressurized air displaces the gas flow path.

4. The turbine engine of claim 1, wherein the first port is located in a vicinity of the throat area.

5. The turbine engine of claim 1, wherein the vane is configured such that the emitted pressurized air creates a region of local flow recirculation in the gas flow path.

6. A vane assembly comprising:
    a vane having:
    a pressure surface portion;
    a suction surface portion;
    an interior defining a cavity operative to receive pressurized air;
    a port communicating between the interior and the pressure surface portion, the port being operative to receive pressurized air from the interior and emit the pressurized air through the pressure surface portion; and
    an adjacent vane such that relative placement of the vane and the adjacent vane define a throat area;
    wherein the pressurized air emitted from the port of the vane displaces the gas flow path such that the throat area is modified and, wherein the vane is configured such that the pressurized air is emitted in a direction that is substantially upstream relative to the gas flow path.

7. The vane assembly of claim 6, wherein the adjacent vane further comprises:
    a port communicating between a suction surface portion and a cavity, the port being operative to emit the pressurized air through the suction surface portion, wherein the pressurized air emitted from the port of the second vane displaces the gas flow path such that the throat area is modified.

8. The vane assembly of claim 7, wherein the vane further comprises a second port communicating between the interior and the suction surface portion;

and the adjacent vane further comprises a second port communicating between the interior and the pressure surface portion.

9. The vane assembly of claim 6, wherein the port is located in a vicinity of the throat area.

10. The vane assembly of claim 6, wherein the vane is configured such that the emitted pressurized air creates a local flow recirculation.

11. The vane assembly of claim 6, wherein:

the assembly further comprises a vane platform having:

an interior defining a cavity operative to receive pressurized air; and a platform port communicating between the interior and an area located between the vane and the adjacent vane;

the platform port is operative to emit the pressurized air such that the gas flow path is displaced radially.

12. A method for displacing the gas flow path between turbine vanes comprising:

directing a gas flow path of a gas turbine engine between a vane and an adjacent vane of a turbine stage, each of the vane and the adjacent vane having an outer surface and an interior; and receiving pressurized air from a port communicating between the outer surface and the interior of the vane such that the emitted pressurized air from the vane displaces the gas flow path and modifies a throat area between the vane and the adjacent vane and wherein the emitted pressurized air from the vane is emitted in a direction substantially counter to the gas flow path.

13. The method of claim 12, further comprising emitting pressurized air from a port communicating between the outer surface of the adjacent vane and the interior of the adjacent vane such that the emitted pressurized air from the adjacent vane also displaces the gas flow path to modify the throat area.

14. The method of claim 13, wherein the emitted pressurized air from the adjacent vane is emitted in a direction substantially counter to the gas flow path.

15. The method of claim 12, further comprising altering the throat area in a radial dimension with respect to the gas flow path.

* * * * *